United States Patent [19]

Jodock et al.

[11] Patent Number: 4,605,347

[45] Date of Patent: Aug. 12, 1986

[54] HIGH SPEED DRILL REAMER

[75] Inventors: Marvin S. Jodock, San Jose, Calif.; Fred Maternus, Chicago, Ill.

[73] Assignees: Lockheed Missiles & Space Company, Inc., Sunnyvale, Calif.; National Carbide Tool, Inc., Skokie, Ill.

[21] Appl. No.: 453,278

[22] Filed: Dec. 27, 1982

[51] Int. Cl.⁴ .......................................... B23B 51/00
[52] U.S. Cl. ................................. 408/224; 408/225; 408/230
[58] Field of Search ............... 408/223, 715, 224, 225, 408/227, 228, 229, 230, 199, 206

[56] References Cited

U.S. PATENT DOCUMENTS

| | | | |
|---|---|---|---|
| 1,069,930 | 8/1913 | Down | 408/223 |
| 1,747,117 | 2/1930 | Klein | 408/223 X |
| 2,193,186 | 3/1940 | Bannister | 408/223 |
| 2,294,969 | 9/1942 | Engvall et al. | 408/225 X |
| 2,482,535 | 9/1949 | Bayless | 408/230 |
| 2,576,664 | 11/1951 | Berlien | 408/230 |
| 2,646,701 | 7/1953 | Letien | 408/230 |
| 2,778,252 | 1/1957 | Oxford | 408/230 |
| 2,786,373 | 3/1957 | Patton | 408/224 |
| 2,859,645 | 11/1958 | Emmons et al. | 408/230 |
| 2,898,787 | 8/1959 | Hofbauer | 408/224 |
| 2,936,658 | 3/1962 | Riley | 408/230 |
| 3,207,196 | 9/1965 | Stillwagon | 145/123 |
| 3,292,237 | 12/1966 | Fisher | 408/230 |
| 3,387,511 | 4/1967 | Ackart | 408/230 |
| 3,443,459 | 5/1969 | Mackey et al. | 408/230 |
| 3,514,828 | 6/1970 | Wale | 407/59 |
| 3,564,947 | 2/1971 | Maier | 408/230 |
| 3,592,555 | 7/1971 | Mackey | 408/225 |
| 3,645,642 | 2/1972 | Koslow | 408/230 |
| 3,779,664 | 12/1973 | Caley et al. | 408/225 |
| 3,806,270 | 4/1974 | Tanner | 408/230 |
| 3,991,454 | 11/1976 | Wale | 408/144 |
| 4,008,976 | 2/1977 | Holzl | 408/144 |
| 4,065,224 | 12/1977 | Siddall | 408/230 |
| 4,116,580 | 7/1978 | Hall | 408/230 |
| 4,125,050 | 11/1978 | Schwartzman et al. | 408/228 X |
| 4,143,723 | 3/1979 | Schmotzer | 408/230 |
| 4,160,616 | 7/1979 | Winblad | 408/144 |
| 4,222,690 | 9/1980 | Hosol | 408/230 |
| 4,411,563 | 10/1983 | Moon | 408/224 |

FOREIGN PATENT DOCUMENTS

| | | | |
|---|---|---|---|
| 1097104 | 3/1981 | Canada | 408/225 |
| 1252565 | 12/1960 | France | 408/223 |
| 31536 | 3/1980 | Japan | 408/230 |
| 48511 | 4/1980 | Japan | 408/230 |
| 71714 | 5/1982 | Japan | 408/199 |
| 937767 | 9/1963 | United Kingdom | 408/223 |

Primary Examiner—William R. Briggs
Attorney, Agent, or Firm—Rodger N. Alleman

[57] ABSTRACT

A drill/reamer bit is described that is particularly suitable for high speed operation and which comprises a bit having a "split" pilot or drill portion with four facets and two cutting edges on each web and a "step" or reamer portion having two reliefs and one cutting edge associated with each web, the webs being formed by a pair of flutes angled at from approximately 8½° to approximately 23°, the bit being formed primarily of fine grain tungsten carbide material, the drill portion having an included angle of approximately 118±2 degrees.

17 Claims, 8 Drawing Figures

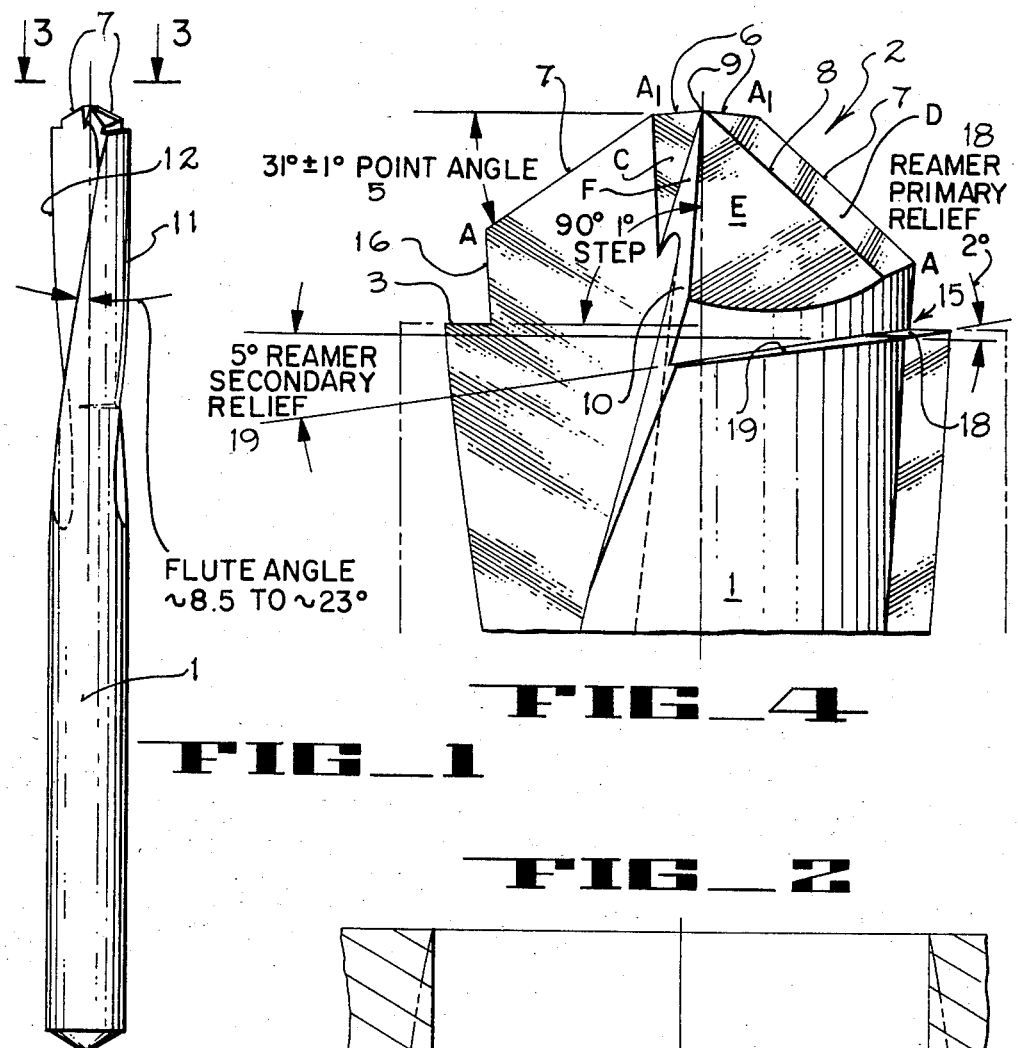
FIG_1
FIG_4
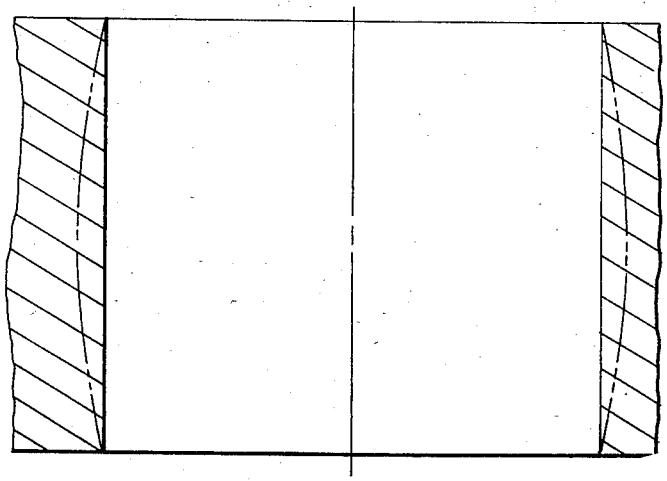
FIG_2

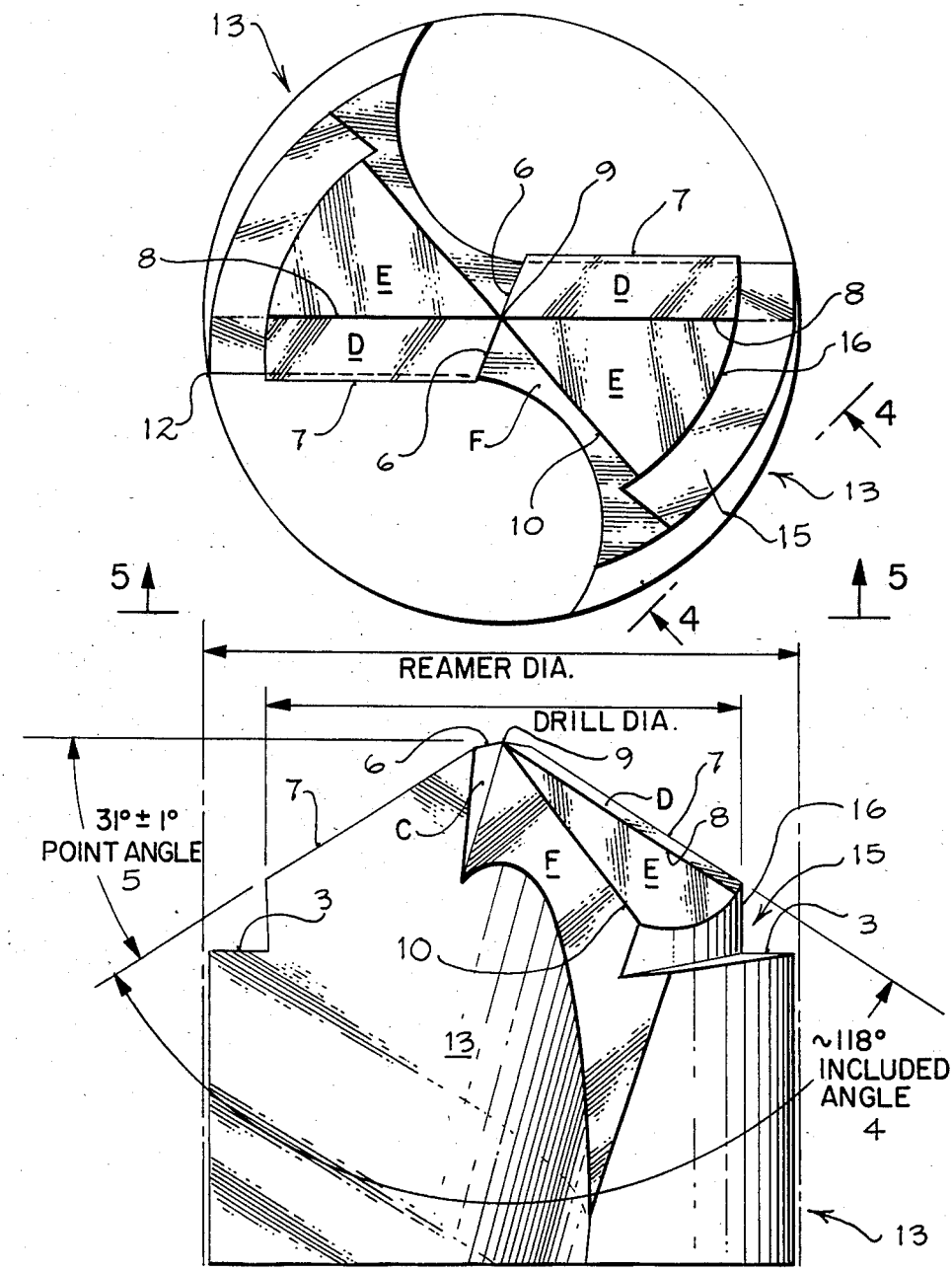

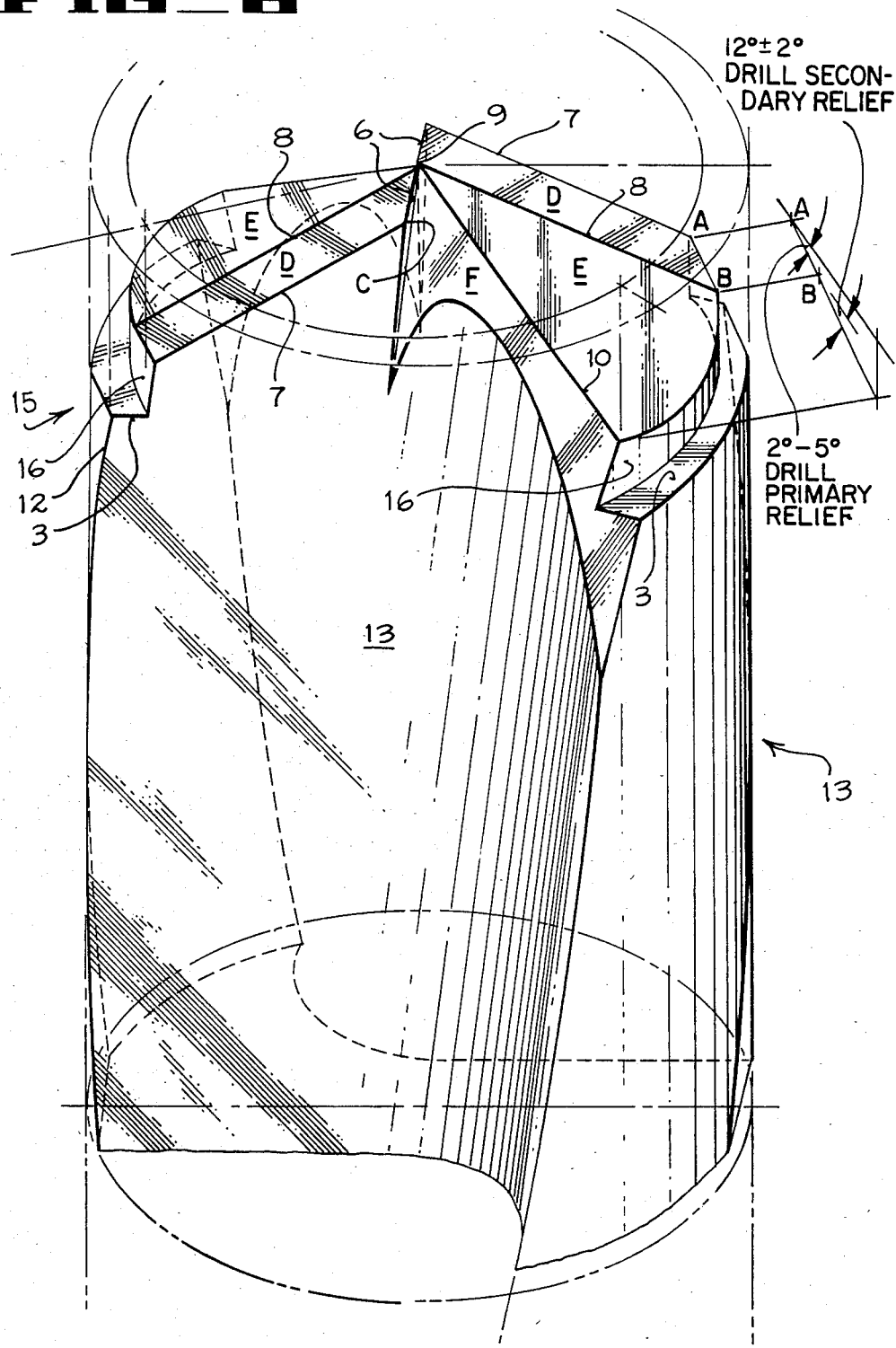
FIG_6

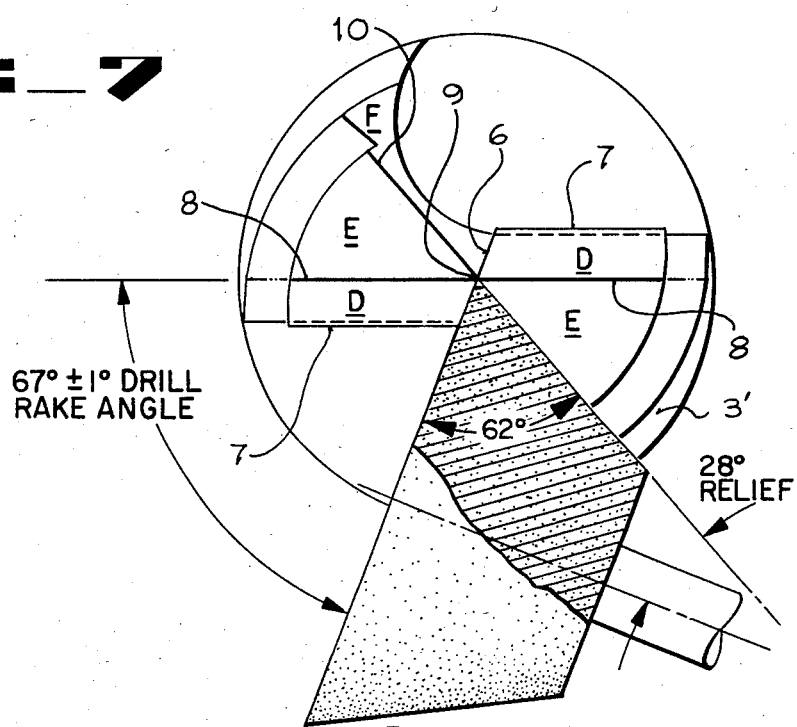
FIG_7
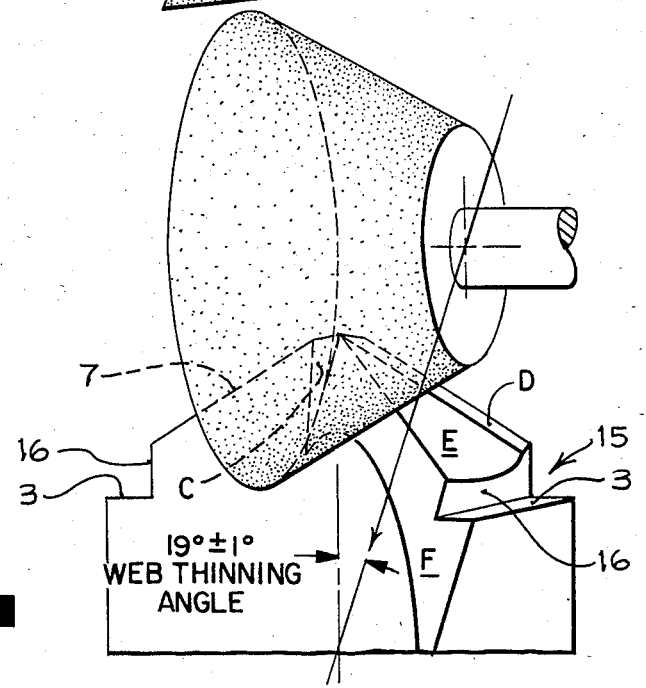
FIG_8

HIGH SPEED DRILL REAMER

TECHNICAL FIELD

This invention relates to the field of high-speed machining and more particularly to a combination drill/reamer bit designed to accommodate the inherent advantages that have been found in high-speed metal removal operations.

The United States Government, and State and domestic municipal governments of the United States may practice and have practiced for them, the invention covered by the claims of this patent.

BACKGROUND ART

Over the years, many types of drills and reamers have been developed which have found utilization in various machining operations. For example, so-called "spade drills" have found utility in connection with woodworking applications, and twist drills, characterized by having one or two spiral grooves machined into the shank of the drill/reamer have been used for metal and other harder materials, with the grooves or "flutes" being useful in furnishing lubricant to the surface being machined as well as removing chips from the path of the drilling operation. It has been found that, although considerable development has been accomplished in the fields of high-speed turning and milling, very little research has been devoted to high-speed drilling. Conventional methods of removing metal at high speeds presently used in industry call for tool velocities extending between approximately 35 to 450 surface feet per minute (SFM) for most steels. For aluminum and similar metals, various charts recommend speeds up to 1800 SFM. These slow cutting speeds induce surface and residual stresses into the part being machined or drilled, causing a warped or out-of-flatness condition, especially in thin parts. Excessive numbers of passes are required to obtain surface finishes desired. In drilling at conventional speeds it is virtually impossible to hold tolerances of less than 0.004 inches of the hole diameter without a ream finish operation. Also, when drilling at slower speeds, i.e., in the neighborhood of 8" feed rate per minute, excessive exit burrs are experienced.

It has been an objective to increase the speed at which metal removal can occur so as to increase productivity in manufacturing operations, thus lowering costs.

Illustrative of cost/productivity considerations is a phenomena which occurs in ultra high-speed milling or drilling in which horsepower requirements of a high-speed spindle drop dramatically when optimum cutting speeds or chip removal is attained. For example, under conventional methods of drilling a 5/32 inch diameter hole in ½ inch thick aluminum, approximately 5 to 10 horsepower at 38 inches per minute feed rate is required. Utilizing a drill/reamer having a high-speed spindle with a tool geometry similar to that defined in the instant invention, it has been found that this same hole can be drilled at 25,000 rpm at 38 inches per minute feed rate with less than one horsepower! The cost of a 10 horsepower high-speed spindle is several thousands of dollars more than a 1 horsepower spindle, a saving which is significant in manufacturing operations.

One of the criteria for success in high-speed drilling is to efficiently remove chips from the hole. Depending on RPM, optimum spiral flute angles have been found which have been successful in chip removal and in eliminating the "bunching" of chips. With high-speed cutting, the bulk of generated heat is contained in the chips which are removed, and the drill and part being machined stay relatively cool.

It has also been found that hole wall finish improves with higher rates of drilling. Furthermore, exit and entry burrs were minimized with a prototype of the instant drill design used with a proper backup plate. Hole diameters produced with such a drill were equal to the drill diameter plus 0.0005 inch on a one-shot drilling basis. A high-rate of retraction (Z direction) is desirable not only to reduce hole rifling, and trapped chips and fragments, but also to prevent heat buildup which accentuates the problem of warpage mentioned above.

SUMMARY OF THE INVENTION

The following patents are a part of the prior art in the field to which the instant invention relates:

| | |
|---|---|
| 4,143,723 | Schmotzer |
| 3,779,664 | Caley |
| 3,443,459 | Mackey |
| 2,646,701 | Letien |
| 2,576,664 | Berlien |
| 2,482,535 | Bayless |
| 3,292,237 | Fisher |
| 3,514,828 | Wale |
| 3,991,454 | Wale |
| 4,008,976 | Holzl |
| 4,160,616 | Winblad |
| 2,778,252 | Oxford |
| 2,859,645 | Emmons |
| 2,898,787 | Hofbauer |
| 2,936,658 | Riley |
| 3,645,642 | Koslow |
| 3,806,270 | Tanner |
| 4,065,224 | Siddall |
| 4,116,580 | Hall |
| 4,222,690 | Hosoi |
| 2,786,373 | Patton |
| 3,207,196 | Stillwagon |
| 3,387,511 | Ackart |

With the above as background, the described bit design constitutes a combination drill/reamer of unique configuration which will permit high-speed drilling at a significantly increased productivity rate.

For example, it was desired to produce approximately 40,000 holes in an aluminum alloy (2219-T8) which required a hole diameter of 0.156 with a tolerance plus 0.001". Use of conventional tools resulted in heat buildup, warpage of the work stock, exit burrs and an undesirable "barrel" shape of the hole. Holes with conventional equipment took approximately 6 seconds each to drill and the whole piece with 10,000 holes took approximately 17 hours to drill. It was found that conventional drills lasted for only approximately 1500 holes before they had to be replaced.

Utilizing a drill/reamer configured in accordance with geometry upon which the present invention is based, this same part with 10000 holes was drilled in less than 4 hours with no exit burrs and no barreling, while maintaining a +0.001 inch tolerance. This was accomplished with no discernable wear on the drill/reamer. Moreover, a substantial improvement in productivity was accomplished because a very significant event occurred as feed rate was increased, as allowed by the tool geometry, from 13 inches to 38 inches per minute. Thrust load forces dropped from 110 pounds to less than 30 pounds. According to existing drilling parameters, this would be unexpected if not impossible. The above was accomplished "dry", no coolants or lubricants being utilized or necessary. The drill/reamer satisfactorily allows spindle speeds of the order of 25,000 rpm while allowing lower horsepower equipment to be utilized, thus saving in capital expenditure costs.

It has been found that bits should be made of micrograin tungsten carbide since its high transverse strength enables the use of thinner webs on the drill without adversely affecting chip removal, and flutes should be polished to further enhance chip removal.

Thus, commercially available tungsten carbide material customarily used for tools as for example, WA-110 available from Walmet Company of Detroit, Mich., may be used to make drills of this invention.

Also, a proper flute angle is important to accomodate chip removal at higher speeds, the flute angle being from approximately 8.5° to approximately 23° depending on RPM. With a bit geometry as defined herein a flute angle of 8.5° is desirable at a drill speed of approximately 25,000 RPM, while a flute angle of approximately 23° works well at a speed of around 1000 RPM. There may be other combinations of speed and flute angle which produce desirable results at other speeds (for example an angle of 8.5° works quite well at "spikes" on the curve of speed/angle at 8700 and 3000 RPM in addition to 25,000 RPM mentioned above).

BRIEF DESCRIPTION OF THE DRAWINGS

Reference is now taken to the drawings wherein

FIG. 1 is an elevational view of a drill/reamer bit constructed in accordance with the teachings of the invention;

FIG. 2 is an illustrative cross-sectional view of a hole (exaggeratedly) showing a "barrel" shape as produced by conventional drill bits;

FIG. 3 is an end-view of the drill/reamer taken along line 3—3 of FIG. 1;

FIG. 4 is a side view of the bit taken along line 4—4 of FIG. 3 showing the four "facets" or faces of the pilot drill as well as the "reliefs" utilized in the reamer portion;

FIG. 5 is a side elevational view taken along line 5—5 of FIG. 3;

FIG. 6 is an isometric view of a drill/reamer constructed in accordance with the invention showing the various drill facets along with the facets of the reamer portion;

FIGS. 7 and 8 are views of the drill/reamer of the invention with a specially designed grinding wheel which is utilized to accomodate the required angularity of two facets of the pilot bit or drill.

DETAILED DESCRIPTION OF A PREFERRED EMBODIMENT

With reference to the above drawings and particularly to FIG. 1, a drill/reamer is shown having a flute angle in accordance with the parameters of the invention of approximately 8.5 degrees to a plane containing the axis of drill/reamer 1. The outer lip of the flute, i.e., the lip terminating at step floor 3, is provided with an edge relief, best shown at 11 in FIG. 1, which is ground onto the outer lip at an angle sufficient to bring the leading edge 12 to a position where it is substantially concentric with the outer circumferential surface of the drill reamer. As best shown in FIG. 4 drill/reamer 1 is provided with a "pilot" or drill portion generally indicated at 2, which portion is generally considered to extend from the tip of the bit back to the step floor 3. It is important to note that the cutting edges 7 and 8 of facet D slope toward the outer diameter of the bit with an included angle 4 of approximately 118 degrees, as best shown in FIG. 5. (It will be understood that included angle 4 comprises the residual angle obtained by subtracting the two symmetrical point angles 5 which are 31 degrees plus or minus 1 degree from a plane perpendicular to the axis of the bit, thus rendering the included angle of edges 7 and 8 to be between 116 and 120 degrees.)

Description of the Four "Facets" on the Web Portion of the Drill

These four facets are designated C, D, E, and F. Facet C terminates at its upper edge in cutting edge 6 which edge is also contained in the plane of facet D, another edge of which facet constitutes cutting edge 7. Grinding of facet D is accomplished so as to provide the point angle 5 as above described and also to provide a positive rake angle or drill primary relief of from approximately 2 to approximately 5 degrees. In other words, facet D is ground so that the plane containing cutting edge 7 is inclined about 2 to about 5 degrees toward the shank of the drill from cutting edge 7.

Cutting edge 6 is thus inclined at a (resultant) angle which slants generally upwardly or toward the point of concentricity 9 of the drill from the face of the flute. To provide an additional frame of reference for comprehending the facets, it is noted that trailing edges 8 on each side of drill/reamer 1 are contained in a plane including the axis of the bit and when viewed from the cutting end as in FIG. 3 constitute an imaginary diameter line extending through point of concentricity 9. Cutting edges 6 as well as trailing edges 8 and 10 also pass through point of concentricity 9. Facets D containing trailing edges 8 extend "over-center," and constitute a portion of the end of webs 13 of the bit, i.e., that portion between the spiral flutes or grooves. The plane of facet D extends toward cutting edge 7 at an angle of approximately 2 to approximately 5 degrees from an imaginary reference plane perpendicular to the axis of the bit and containing the point where trailing edge 8 intersects step wall 16 thus to provide a positive rake angle or drill primary relief as described above.

Facet E slants from trailing edge 8 rearwardly toward the shank of the bit, at an angle of approximately 12±2 degrees with respect to the reference plane described above. Thus, cutting edges 6 and 7 on each side of the drill constitute four initial cutting edges of the drill reamer. Cutting edges 6 "bite" into metal being drilled from the very initiation of rotation and metal removal is thus initiated at this same point in time. As edge 6 is "working," i.e., cutting into stock to be drilled, cutting edge 7 provides additional cutting action, thus providing a total of four cutting edges in the drill point.

Facet F is ground with a wheel that is specifically configured as shown in FIGS. 7 and 8. With a generally tapered outer grinding surface providing an acute angle at the outer tip of the wheel of approximately 62 degrees, this wheel is engaged with the work piece stock constituting the drill being made at a web thinning angle of approximately 19 degrees plus or minus 1 degree as shown in FIG. 8. Thus, the grinding wheel produces facet C which is inclined at an angle of approximately 19 degrees with respect to the axis of the drill. Because of the particular shape of the grinding wheel, facet F is simultaneously produced which is also angled slightly with respect to the axis of the drill. This angle is not considered critical and is as above described a "resultant" of the grinding of facet C as indicated. In grinding the bit, flutes are first ground, then polished as desired, followed by grinding drill primary and secondary reliefs (facets D and E).

The reamer portion is particularly important in minimizing exit burrs, a critical consideration when closely spaced holes are to be drilled.

The reamer portion of the drill is provided by forming it with a "step" generally indicated at 15 with the wall 16 constituting a circumferential surface generally parallel with the axis of the drill, and which desirably is provided with a progressive radial relief as best shown in FIG. 3. Step 15 is also provided with a step base floor 3 as described above which is at approximately 90 degrees to wall 16. Base 3 and wall 16 of step 15 may vary in width and height respectively, as may be desired to meet the requirements of a given application. However, for purposes of drilling aluminum with a 0.156" drill/reamer a width of approximately 0.006" and a wall height of approximately 0.030" is desirable when measured at the primary cutting edge of the step.

Base 3 of step 15 is also desirably provided with a primary and secondary relief. The step primary relief is desirably approximately 2 degrees and the step secondary relief approximately 5 degrees with respect to a plane perpendicular to the bit axis. The primary relief 18 extends from the point of intersection with a flute back to a point approximately in alignment with the outer end of trailing edge 8. Secondary relief 19 thus commences at a position on base 3 in approximate vertical alignment with trailing edge 8 and extends back to the intersection of base 3 with facet F.

The width of the step base 3 is essentially equal along its generally radial surface.

The beveled grinding wheel shown in FIGS. 7 and 8 is positioned to provide cutting edge 6 at an angle of approximately 67±1 degree to the imaginary plane containing trailing edges 8 and the axis of the bit. Thus an obtuse angle is formed between edges 6 and 7 which approximates 113 degrees.

It should be noted that the angles of facets E and F, and thus the thickness of the web portion backing up cutting edge 7 in facet D may be varied as indicated herein but should be generally within the ranges specified, thus to provide optimum web strength and drill integrity when removing metal at high speeds.

While a preferred embodiment of the invention has been specifically illustrated and described herein, it is to be understood that minor variations may be made in the invention without departing from the spirit and scope thereof as defined in the claims set forth hereinbelow.

I claim:

1. A drill bit having a pair of spiral flutes separated by a pair of webs, each of said webs terminating at the cutting end of said bit in first, second, third, and fourth facets, a trailing edge and primary and secondary cutting edges contained in the plane of said first facet, each of said webs having a step floor extending from the periphery of said webs to a smooth wall, said wall extending parallelly to the drill axis from said step floor to said facets, and a relief in said step floor intersecting with said flute surface thus to constitute a reamer cutting edge.

2. A drill bit as claimed in claim 1 in which said cutting edges are angled with respect to each other at an obtuse angle.

3. A drill/reamer bit as claimed in claim 2 in which said primary cutting edge is in a plane containing the drill axis and is angled from the drill point of concentricity toward the shank of the drill.

4. A drill bit as claimed in claim 3 in which said secondary cutting edge is generally parallel to the trailing edge of said first facet, said trailing edge being contained in a plane containing the drill axis, said first facet being angled from said trailing edge away from the drill shank, thus to present a positive rake angle toward material to be drilled.

5. A drill bit as claimed in claim 4 and in which said first facet is angled from a reference plane which is perpendicular to the drill axis at an angle of from approximately 2 to approximately 5 degrees, said secondary cutting edge terminating at said smooth wall.

6. A drill bit as claimed in claim 5 in which said trailing edge is contained in the plane of said second facet and in which said second facet is angled toward the shank of said drill at an angle of 12±2 degrees from said reference plane, thus to constitute a secondary drill relief for said drill.

7. A drill bit as claimed in claim 6 in which said flute is angled with respect to the drill axis at approximately 8.5 to approximately 9 degrees and which is made substantially of micrograin tungsten carbide.

8. A drill/reamer bit having a pair of spiral flutes separated by two webs, said webs terminating generally at the cutting end of said bit in diametrically opposite geometries and constituting:

a drill portion, and a stepped reamer portion, said drill portion having first, second, third and fourth facets, primary and secondary drill cutting edges defining two edges of said first facet, said primary drill cutting edge and the bit axis defining a plane in which the primary drill cutting edge gently slopes from the point of concentricity toward the shank of the bit, said secondary drill cutting edge intersecting said primary drill cutting edge at an obtuse angle and being generally parallel to and in the plane of the trailing edge of said first facet, said trailing edge being contained in a plane of the bit axis, said first facet being angled from said trailing edge away from the bit shank thus to present a positive rake angle toward material being drilled, said trailing edge of said first facet being contained in the plane of said second facet, said second facet being angled from said first facet trailing edge rearwardly toward the bit shank at an angle which is greater than the angle of said first facet, the trailing edge of said second facet being in a plane containing the bit axis and constituting an edge of the plane constituting the third facet, the trailing edge of said third facet terminating at said flute surface, said drill primary cutting edge being contained in and constituting an edge of the plane of said fourth facet, another edge of which facet bisects said drill primary cutting edge and terminates at said flute surface, said reamer portion constituting a step defined by a smooth circumferencial wall which is parallel to the bit axis, the floor of said step constituting an annular surface extending between the base of said wall and the outer surface of the bit, and at least one relief in said floor intersecting with said flute surface thus to constitute a reamer cutting edge.

9. A drill/reamer bit as claimed in claim 8 in which said drill secondary cutting edge constitutes an edge of said flute, and in which said first facet is angled away from the shank end at an angle of from approximately 2° to approximately 5° with respect to an imaginary reference plane perpendicular to the bit axis.

10. A drill/reamer bit as claimed in claim 8 and in which the included angle defined by said secondary cutting edge is approximately 116±2 degrees.

11. A drill/reamer bit as claimed in claim 8 and in which said flute angle is approximately 8.5° and which is made substantially of micrograin tungsten carbide.

12. A drill/reamer bit as claimed in claim 9 and in which the included angle defined by said secondary cutting edge is approximately 116±2 degrees.

13. A drill/reamer bit as claimed in claim 8 and in which said fourth facet is angled with respect to the bit axis at approximately 19±1 degrees.

14. A drill/reamer bit as claimed in claim 8 and in which said obtuse angle is approximately 113 degrees.

15. A drill/reamer bit as claimed in claim 8 and in which said step floor is perpendicular to the bit axis.

16. A drill/reamer bit as claimed in claim 10 in which said step floor is perpendicular to the bit axis, and which is made substantially of micrograin tungsten carbide.

17. A drill/reamer bit having a pair of spiral flutes separated by two webs, said webs terminating generally at the cutting edge of said bit in diametrically opposite geometrics and including:

a drill portion, and a reamer portion
said drill portion having first, second, third, and fourth facets,
primary and secondary drill cutting edges defining two edges of said first facet, said primary drill cutting edge and the bit axis defining a plane in which the primary drill cutting edge slopes slightly toward the shank of the bit,
said secondary drill cutting edge intersecting said primary drill cutting edge at an obtuse angle and being generally parallel to and in the plane of the trailing edge of said first facet, said trailing edge being contained in a plane of the bit axis and angled at an included angle of approximately 116±2 degrees,
said first facet being angled from said trailing edge away from the bit shank at from approximately 2 to approximately 5 degrees, thus to approach material being drilled with a positive rake angle,
said trailing edge of said first facet being contained in the plane of said second facet, said second facet being angled so that a curved line therein concentric with said bit axis is angled with respect to a reference plane perpendicular to said axis at an angle of approximately 12±2 degrees,
the trailing edge of said second facet being in a plane containing the bit axis and constituting an edge of the plane constituting said third facet,
the trailing edge of said third facet terminating at said flute surface, and being angled with respect to the bit axis,
said drill primary cutting edge being contained in and constituting an edge of the plane of said fourth facet, another edge of which facet bisects said drill primary cutting edge and terminates at said flute surface, said fourth facet being angled with respect to the drill axis at an angle of approximately 19 degrees,
said reamer portion constituting a step defined by a circumferential wall which is radially relieved with respect to the bit axis and parallel thereto, the floor of said step constituting an annular surface perpendicular to the bit axis and extending between the base of said wall and the outer surface of the bit,
said floor intersecting with said flute surface thus to constitute a reamer cutting edge,
said reamer cutting edge being contained in a plane of first relief which is angled toward said shank with respect to a reference plane perpendicular to the bit axis of at least approximately 2 degrees,
the trailing edge of said first relief contained in a plane which slopes with respect to said reference plane at least approximately 5 degrees toward the bit shank,
said flutes being angled with respect to the bit axis at from approximately 8½ degrees to approximately 23 degrees, said being being made substantially of micrograin tungsten carbide.

* * * * *